US010115249B2

(12) United States Patent
Levitov

(10) Patent No.: US 10,115,249 B2
(45) Date of Patent: Oct. 30, 2018

(54) CARD-COMPATIBLE BIOMETRIC ACCESS CONTROL SYSTEM

(71) Applicant: Yevgeny Levitov, San Antonio, TX (US)

(72) Inventor: Yevgeny Levitov, San Antonio, TX (US)

( * ) Notice: Subject to any disclaimer, the term of this patent is extended or adjusted under 35 U.S.C. 154(b) by 0 days.

(21) Appl. No.: 15/602,115

(22) Filed: May 23, 2017

(65) Prior Publication Data

US 2018/0018839 A1 Jan. 18, 2018

Related U.S. Application Data

(60) Provisional application No. 62/340,516, filed on May 23, 2016.

(51) Int. Cl.
*G06K 5/00* (2006.01)
*G07C 9/00* (2006.01)

(52) U.S. Cl.
CPC ..... *G07C 9/00087* (2013.01); *G07C 9/00103* (2013.01); *G07C 2009/00095* (2013.01)

(58) Field of Classification Search
CPC ............ G07C 9/00087; G07C 9/00103; G07C 2009/00095
USPC .................................................. 235/375, 382
See application file for complete search history.

(56) References Cited

U.S. PATENT DOCUMENTS

| | | | | |
|---|---|---|---|---|
| 7,376,839 B2 * | 5/2008 | Carta | G07C 9/00039 | 713/185 |
| 9,224,257 B2 * | 12/2015 | Smith | G07C 9/00904 | |
| 2002/0138767 A1 * | 9/2002 | Hamid | G06Q 10/02 | 726/5 |
| 2003/0028814 A1 * | 2/2003 | Carta | G07C 9/00039 | 726/21 |
| 2006/0200427 A1 * | 9/2006 | Morrison | G06Q 20/223 | 705/67 |
| 2008/0015994 A1 * | 1/2008 | Bonalle | G06Q 20/105 | 705/44 |
| 2008/0080750 A1 * | 4/2008 | Bee | G06F 21/32 | 382/124 |
| 2009/0021349 A1 * | 1/2009 | Errico | H04L 9/3231 | 340/5.82 |
| 2009/0167492 A1 * | 7/2009 | Madafferi | G07C 9/00158 | 340/5.82 |
| 2010/0174914 A1 * | 7/2010 | Shafir | G06K 9/00067 | 713/186 |
| 2011/0167271 A1 * | 7/2011 | Errico | G06F 21/32 | 713/170 |
| 2012/0192250 A1 * | 7/2012 | Rakan | G06F 3/03545 | 726/2 |
| 2012/0288169 A1 * | 11/2012 | Kim | G06K 9/0002 | 382/124 |
| 2012/0317639 A1 * | 12/2012 | Huang | H04L 9/3231 | 726/19 |
| 2013/0008958 A1 * | 1/2013 | Smith | G07C 9/00904 | 235/382 |
| 2013/0234825 A1 * | 9/2013 | Malhotra | A61B 5/1172 | 340/5.53 |

(Continued)

*Primary Examiner* — Paultep Savusdiphol
(74) *Attorney, Agent, or Firm* — Larisa Migachyov

(57) ABSTRACT

A biometric access-control system is disclosed, wherein the system is compatible with access cards, comprising a biometric reader that converts biometric data to emulate an access card number, wherein only the emulated access card number is stored in a database.

13 Claims, 6 Drawing Sheets

(56) References Cited

U.S. PATENT DOCUMENTS

| | | | | |
|---|---|---|---|---|
| 2014/0222596 | A1* | 8/2014 | S | G06Q 20/12 705/18 |
| 2016/0241405 | A1* | 8/2016 | Jeong | H04L 63/0428 |
| 2017/0076522 | A1* | 3/2017 | Ives-Halperin | G06Q 10/02 |
| 2017/0109950 | A1* | 4/2017 | Bacco | G07C 9/00087 |

* cited by examiner

CARD-COMPATIBLE BIOMETRIC ACCESS CONTROL SYSTEM

CROSS-REFERENCE TO RELATED APPLICATIONS

The present application takes priority from U.S. Provisional App. No. 62/340,516, filed May 23, 2016, which is herein incorporated by reference.

BACKGROUND

Access control is an important problem with many applications. One application for access control is where a facility contains a plurality of secure facilities, offices and compartments, each belonging to a particular person; i.e. each person only needs access to the particular facilities, offices and compartments authorized for them, not any of the other ones. Typically, this is done with a card system; each person has an access card, and the system comprises card readers that have no intelligence built in, and an access control panel, comprising hardware and software that enrolls cards into the access control system and assigns access privileges and other user information to each one. The card reader transfers the card number to the access control panel by using a Wiegand interface; a database then stores the access card number for each user, and any other information related to the user.

Biometric access is much simpler for a user than card access; however, to retrofit biometrics into an existing card-based access control system, two databases are required. One is the conventional access card number database which contains user information, card number assigned to each user, and user privileges, and the other database is one that contains biometric information for each enrolled user as well as user information and user privileges and correlates it to the user's access card number. This requires integration, or bridging between two databases, which is a complex procedure; it means that enrollment in one database should trigger the other database to create the same event. This procedure is memory-intensive and consumes a lot of computing power. Integrating the database completely requires the creation of additional fields for biometric credentials and biometric reader service information which makes the combined database larger and more complicated.

Furthermore, the enrollment procedure for a biometric access control system is more complex, involving obtaining and storing the user's biometric information in a separate data base.

A need exists for a biometric reader that can generate a unique number similar in format to an access card number and transmit it through a Wiegand interface to the access panel.

A need also exists for a biometric reader that generates a unique biometric credential that can be recognized as valid by an access control panel without any storage or retrieval of biometric information.

SUMMARY OF THE INVENTION

An object of the present invention is to provide a biometric reader that can function seamlessly with an access card (Wiegand output from card reader) based access control system.

Another object of the present invention is to provide a biometric access control system that requires no retrofitting to be used with an access card (Wiegand output from card reader) based access control system.

Another object of the present invention is to provide a biometric access control system that does not require user enrollment of biometric credentials or storage in a separate data base.

Another object of the present invention is to provide a biometric access control system that outputs a number in the same format as access cards used with the system.

The system of the present invention comprises a biometric reader, a processor and memory, a communication module for communicating with a server, and a server that comprises a database of users and a numerical code associated with each user's name. The processor is configured to receive biometric data from the biometric reader, and to process it in such a way as to obtain a numerical code that is the same format as a numerical code used by an access card. There is no biometric data stored in the database.

The numerical code may be in any commonly used access-card format, such as 26-bit, 32 bit, 35 bit, 36 bit, 64 bit, or any other available Wiegand format.

In an embodiment, the biometric reader is a fingerprint reader, and the processor is configured to receive a fingerprint image from the fingerprint reader, normalize the fingerprint image, extract minutiae points from the image, and create a matrix from the minutiae data. The matrix preferably comprises four columns—a row index, a column index, an orientation angle, and a type of minutiae point. The matrix is then converted to a unique number, which is then converted to a numerical code used by an access card.

In an embodiment, the numerical code may comprise a one-bit parity code, an 8-bit facility code, a 16-bit user/card code, and a one-bit parity code.

The method of the present invention comprises receiving biometric data using a biometric reader, converting the data to a matrix, converting the matrix to a numerical code, wherein the numerical code is in the same format as a numerical code used by access cards in the card-based access system, and storing the numerical code in a database.

In an embodiment, the biometric reader is a fingerprint reader and the biometric data is a fingerprint image.

In an embodiment, the step of converting the fingerprint image to a matrix comprises extracting minutiae from the fingerprint image and creating a matrix, wherein the matrix comprises four columns—a row index, a column index, an orientation angle, and a type index for each minutiae point, wherein the type is selected from a termination point, bifurcation point, and a normal ridge pixel.

In an embodiment, the step of converting a matrix to a numerical code comprises using a matrix to string conversion algorithm.

In an embodiment, the numerical code can be a 26-bit, 32 bit, 35 bit, 36 bit, 64 bit, or any other available Wiegand format.

LIST OF FIGURES

DETAILED DESCRIPTION OF THE PREFERRED EMBODIMENT

It will be understood that the foregoing detailed description is used solely as an illustration of the preferred embodiment or embodiments of the present invention, and that the only limitations on the scope of the invention come from the appended claims.

Figure 1:
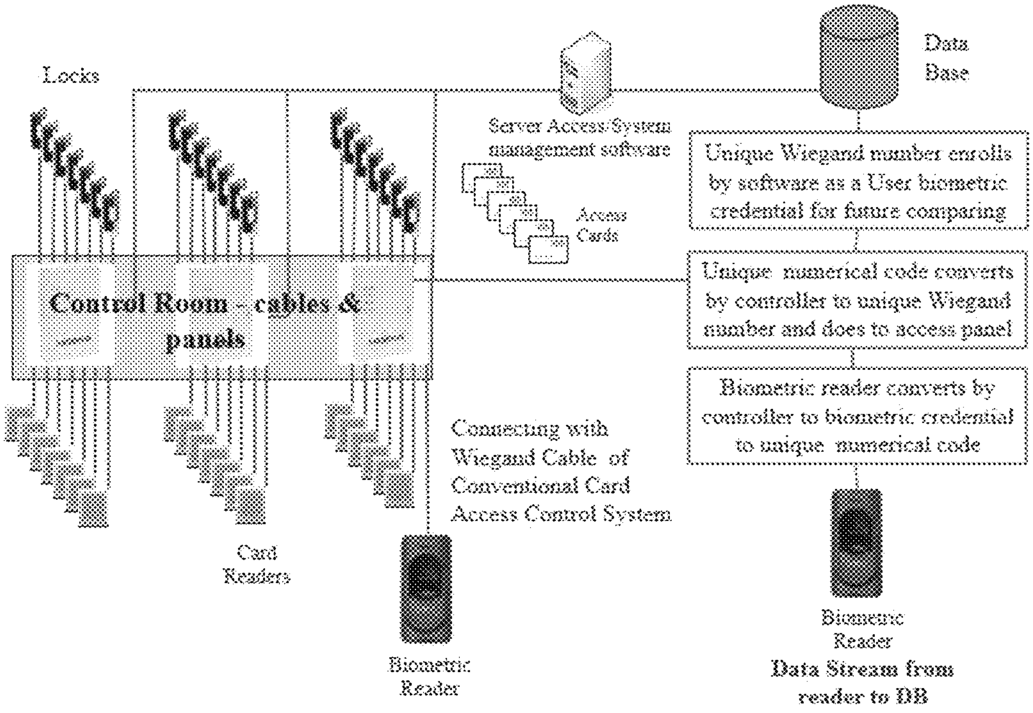
FIG. 1 shows the reader of the present invention used in a Wiegand-based access control system.

FIG. 1 shows a diagram of the biometric reader used in an access control system. A biometric reader is used to receive data from the user. The data may be a fingerprint, face identification, or any other biometric data. The biometric reader then converts the data to a unique numerical code in the same format as an access card number used in the system—essentially, the biometric data is converted to emulate an access card. If the user is new, their numerical code is added to the database along with any other personal data needed for the system. If the user is not new, their numerical code is looked up in the database, compared with the numerical code from the biometric reader, and if the numbers match, the user is granted access.

Figure 2:
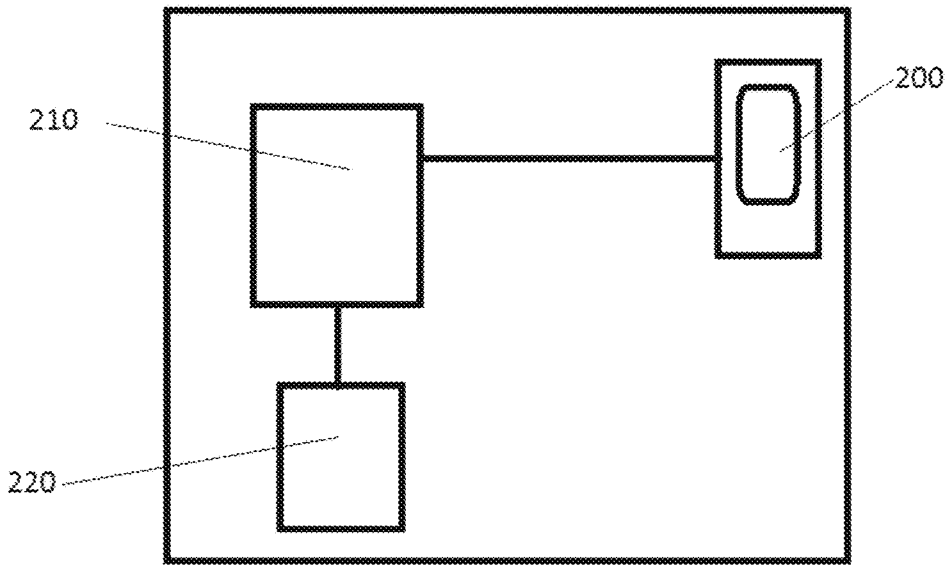
FIG. 2 shows a diagram of the biometric reader of the present invention.

FIG. 2 shows a diagram of the biometric reader itself. A biometric reader 200 is used to receive biometric data from the user. The data is then sent to a processor 210 (with a memory, which is not shown). The processor may be any type that is capable of simple image processing and numerical computation. The processor 210 receives biometric data from the biometric reader and converts it to a numerical code. The numerical code is preferably in the same format as a numerical code used by an access card in the same access control system. In the preferred embodiment, the processor may be configurable to convert biometric data to any format of access card number. Once the numerical code is produced, it is sent to the communication module 220, which transmits it to a server. The server (not shown) only stores the numerical code—not the biometric data. This saves memory and decreases the complexity of the system.

Any type of biometric reader may be used in the system. For any type of biometric reader, biometric data is received and analyzed. The results of the analysis are converted to a matrix, which is then converted to a numerical code and sent to the server for storage. For example, the present invention may be used with fingerprint recognition, face recognition, iris recognition, vein pattern recognition, or voice recognition, as a non-limiting list of examples. While the example discussed below is a fingerprint reader, this should not be perceived as a limitation on the scope of the invention, which does extend to any available biometric identification method.

Figure 3:
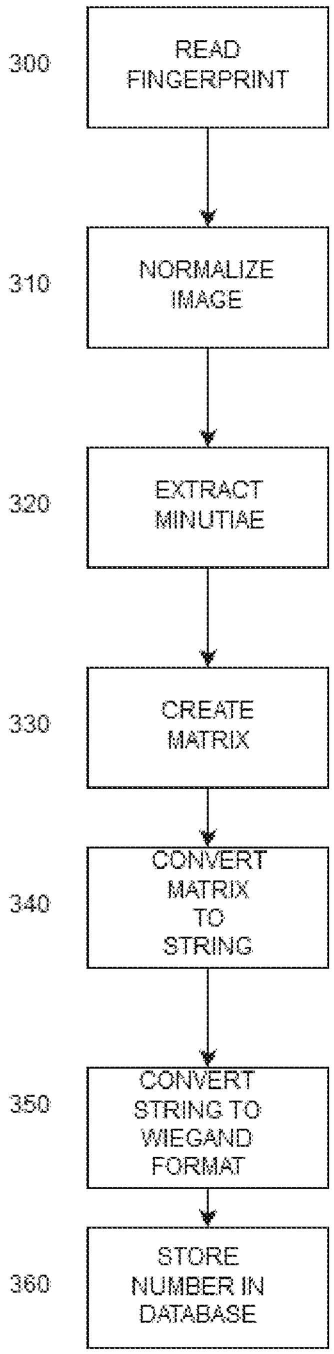
FIG. 3 shows a flowchart of the operation of the system of the present invention.

FIG. 3 shows a diagram of the process used for practicing an embodiment of the present invention, wherein the biometric reader is a fingerprint reader. First, a fingerprint is read 300. Any standard fingerprint reader module may be used for that purpose. An image of the finger is then obtained. In the preferred embodiment, as commonly used in the industry, the image is a grayscale image with intensity values ranging from 0-255.

Figure 4:
FIG. 4 shows an example of a fingerprint being processed to extract minutiae data.

After the image is obtained, it is normalized 310. Normalization involves 3 steps: rotation, binarization, and filtering. First, the fingerprint image is rotated to be put in a vertical position. Then, the image is binarized to make all the ridges equally dark and all the valleys equally light. Then, the image is filtered to convert all the ridges to thin lines. FIG. 4 shows the results of each step.

Figure 5:
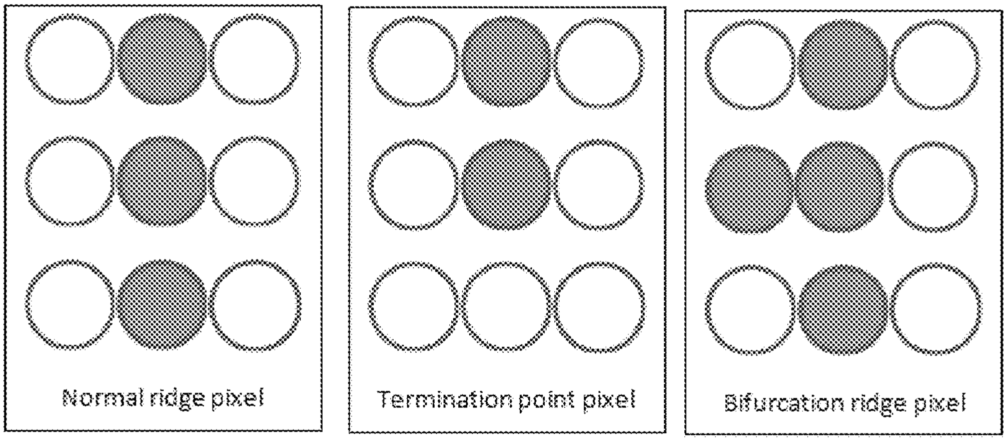
FIG. 5 shows an example diagram for a method of identifying minutiae.

After the image is filtered, minutiae are extracted 320 from the fingerprint (FIG. 4 shows the results of minutiae extraction). A minutiae point can be a termination point (i.e. a point where a ridge ends), a bifurcation point (i.e. a point where a ridge bifurcates), or a normal ridge pixel (i.e. a point along the ridge). FIG. 4 shows the results of minutiae extraction. For each minutiae point, a location and an angle is recorded. FIG. 5 shows a sample of each minutiae point at a very magnified view; a 3×3 window is used to identify each minutiae point. After the minutiae points are identified, false minutiae points are removed.

After the minutiae points are recorded, a matrix is created 330. In the preferred embodiment of the present invention, the matrix comprises four columns:

a. Row index of each minutiae point;
b. Column index of each minutiae point;
c. Orientation angle of each minutiae point;
d. Type of minutiae (in the preferred embodiment, a value of 1 is assigned for termination and 3 for bifurcation; it will be understood, however, that any correspondence between numbers and types of minutiae can be compatible with the present invention).

In the preferred embodiment, the orientation angle is obtained by converting row and column indexes to polar coordinates, as follows:

$$\begin{pmatrix} r_k^T \\ \phi_k^T \\ \theta_k^T \end{pmatrix} = \begin{pmatrix} \sqrt{(row_k^T - row_{ref}^T)^2 + (col_k^T - col_{ref}^T)^2} \\ \tan^{-1}\left(\dfrac{row_k^T - row_{ref}^T}{col_k^T - col_{ref}^T}\right) \\ \theta_k^T - \theta_{ref}^T \end{pmatrix}$$

Once a matrix is obtained, it is converted to a numerical string 340. In the preferred embodiment, a Matlab mat2str algorithm is used for that purpose; however, any other matrix to string conversion algorithm may also be used.

Figure 6:
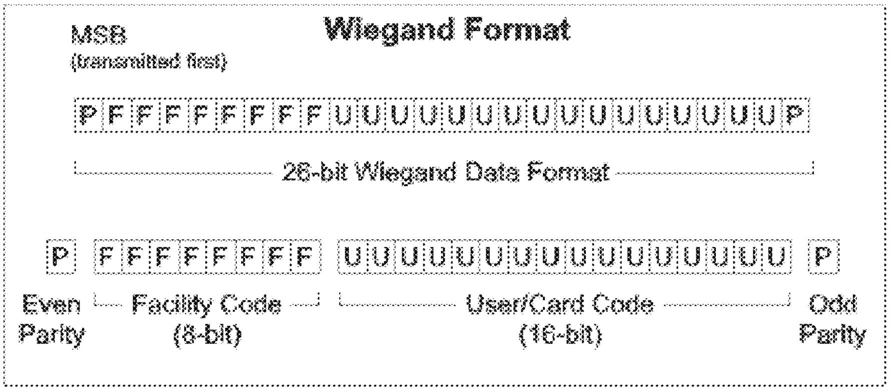
FIG. 6 shows a sample format for a Wiegand access card number.

Finally, the numerical string is converted to a Wiegand access card number format 350. Most access cards use some form of a Wiegand format, whether a 26-bit, 32-bit, 35-bit, 36-bit, or 64-bit. FIG. 6 shows a diagram of a 26-bit Wiegand number format.

It will be understood that there are other methods of fingerprint analysis that do not use minutiae points, and that said other methods of fingerprint analysis may also be used to practice the present invention, even in the embodiments that use fingerprints. For example, pattern recognition may also be used to produce a matrix based on a fingerprint.

Exemplary embodiments are described above. It will be understood that the invention is not limited to those exemplary embodiments but also encompasses reasonable equivalents such as will be apparent to a person of reasonable skill in the art, and is only limited by the appended Claims.

The invention claimed is:

1. A card-compatible biometric system for access control, comprising:

a biometric reader;

a processor and memory, wherein the processor is configured to perform the following actions:

receive biometric data from the biometric reader;

process the biometric data in such a way as to obtain a numerical code, wherein the numerical code is in the same format as a numerical code used by an access card, wherein the access card is also used to obtain access in the system;

a communication module, wherein the communication module communicates with a server;

a server, wherein the server comprises a database of users, wherein the database comprises at least one numerical code associated with a user's name, wherein no other biometric data is stored in the database.

2. The card-compatible biometric system of claim 1, wherein the numerical code is in one of the following formats: 26-bit, 32 bit, 35 bit, 36 bit, 64 bit.

3. The card-compatible biometric system of claim 1, wherein the biometric reader is one of the group comprising: a fingerprint reader, a face reader, an iris reader, a voice reader, a vein reader.

4. The card-compatible biometric system of claim 1, wherein the biometric reader is a fingerprint reader, and wherein the processor is configured to process the biometric data by performing the following steps:

receive a fingerprint image from the fingerprint reader;

normalize the fingerprint image;

extract minutiae points from the image;

create a matrix from the minutiae data, wherein the matrix comprises the following four columns:

a first column comprising a row index for each minutiae point;

a second column comprising a column index for each minutiae point;

a third column comprising an orientation angle for each minutiae point;

a fourth column comprising a code for a type of minutiae, wherein the type is selected from the following group: termination point, bifurcation point, and normal ridge pixel;

converting the matrix to a unique number;

converting the unique number to a numerical code used by an access card.

5. The card-compatible biometric system of claim 1, wherein the numerical code comprises:

a one-bit parity code;

a facility code;

a user/card code;

a one-bit parity code.

6. A method for retrofitting biometric access onto an existing card-based access system, wherein the system comprises at least one access card, comprising:

receiving biometric data using a biometric reader;

converting the biometric data to a matrix;

converting the matrix to a numerical code, wherein the numerical code is in the same format as a numerical code used by the at least one access card;

storing the numerical code in a database.

7. The method of claim 6, wherein the biometric reader is a fingerprint reader and the biometric data is a fingerprint image.

8. The method of claim 7, wherein the step of converting the biometric data to a matrix comprises:

extracting minutiae from the fingerprint image;

creating a matrix, wherein the matrix comprises four columns, wherein:

a first column comprises a row index for each minutiae point;

a second column comprises a column index for each minutiae point;

a third column comprises an orientation angle for each minutiae point;

a fourth column comprises a code for a type of minutiae, wherein the type is selected from the following group: termination point, bifurcation point, and normal ridge pixel.

9. The method of claim 6, wherein the biometric reader is one of the group comprising: a face reader, a voice reader, an iris reader, a vein reader.

10. The method of claim 6, wherein the step of converting the matrix to a numerical code comprises using a matrix to string conversion algorithm.

11. The method of claim 6, wherein the numerical code is in one of the following Wiegand formats: 26-bit, 32 bit, 35 bit, 36 bit, 64 bit.

12. The method of claim 6, wherein the numerical code comprises:

a one-bit parity code;

a facility code;

a user/card code;

a one-bit parity code.

13. The method of claim 6, further comprising:

prior to the step of receiving biometric data, selecting a desired access card format;

configuring the processor to generate a numerical code in the desired access card format.

* * * * *